United States Patent
Seeman et al.

(10) Patent No.: US 8,424,395 B2
(45) Date of Patent: Apr. 23, 2013

(54) APPARATUS FOR MONITORING DEPOSITION OF A NOBLE METAL IN A NUCLEAR REACTOR

(75) Inventors: Russell Seeman, San Ramon, CA (US); Thomas Alfred Caine, San Jose, CA (US); Thanh Tu, Hayward, CA (US)

(73) Assignee: General Electric Company, Schenectady, NY (US)

( * ) Notice: Subject to any disclaimer, the term of this patent is extended or adjusted under 35 U.S.C. 154(b) by 1106 days.

(21) Appl. No.: 11/976,005

(22) Filed: Oct. 19, 2007

(65) Prior Publication Data
US 2008/0063134 A1    Mar. 13, 2008

Related U.S. Application Data

(62) Division of application No. 11/453,808, filed on Jun. 16, 2006, now Pat. No. 7,430,902.

(51) Int. Cl.
*G01N 1/12* (2006.01)

(52) U.S. Cl.
USPC ............................................. 73/864.58

(58) Field of Classification Search ........................ None
See application file for complete search history.

(56) References Cited

U.S. PATENT DOCUMENTS

| | | | | |
|---|---|---|---|---|
| 2,991,439 A * | 7/1961 | Marsh et al. | ..................... | 338/13 |
| 3,049,915 A * | 8/1962 | Freedman et al. | ................. | 73/86 |
| 3,242,740 A * | 3/1966 | Niskin | ....................... | 73/863.31 |
| 3,815,422 A * | 6/1974 | Niskin | ....................... | 73/864.67 |
| 4,697,465 A * | 10/1987 | Evans et al. | .................... | 73/866.5 |
| 4,700,759 A * | 10/1987 | Duerr | ........................... | 144/195.1 |
| 5,094,113 A * | 3/1992 | Wood | .......................... | 73/864.67 |
| 5,130,080 A | 7/1992 | Niedrach | | |
| 5,130,081 A | 7/1992 | Niedrach | | |
| 5,135,709 A | 8/1992 | Andresen et al. | | |
| 5,164,152 A | 11/1992 | Kim et al. | | |
| 5,303,600 A * | 4/1994 | Wood et al. | ................ | 73/864.62 |
| 5,307,385 A | 4/1994 | Shimanuki et al. | .......... | 376/249 |
| 5,600,961 A | 2/1997 | Whipple, III | | |
| 5,602,888 A | 2/1997 | Hettiarachchi et al. | | |
| 5,608,766 A | 3/1997 | Andresen et al. | | |
| 5,805,653 A | 9/1998 | Hettiarachchi et al. | | |
| 5,818,893 A | 10/1998 | Hettiarachchi et al. | | |
| 6,077,418 A | 6/2000 | Iseri et al. | ................... | 205/775.5 |
| 6,440,297 B1 | 8/2002 | Kim et al. | ...................... | 205/791 |
| 6,672,830 B2 * | 1/2004 | Rockwood | .................... | 415/119 |

* cited by examiner

*Primary Examiner* — Robert R Raevis
(74) *Attorney, Agent, or Firm* — Harness, Dickey & Pierce, P.L.C.

(57) ABSTRACT

In a method of monitoring deposition of a noble metal in an intergranular stress corrosion crack (IGSCC) in a metal reactor shroud wall of a nuclear reactor, a metal sample may be placed at a location within near an inner surface of the metal reactor shroud wall. The sample may be submerged below a water line in the reactor and includes at least one thermal fatigue crack. The sample is maintained at the location for a given duration, and a given amount of the noble metal is added into the reactor water while the sample is maintained at the location. The sample is then removed. In an example, a surface crevice deposition monitor for a reactor includes a flow conditioner arranged between a securing mechanism and an anchor, and at least one sample holder connected between the securing mechanism and flow conditioner.

8 Claims, 7 Drawing Sheets

APPARATUS FOR MONITORING DEPOSITION OF A NOBLE METAL IN A NUCLEAR REACTOR

PRIORITY STATEMENT

This application claims priority as a divisional, under 35 U.S.C. §121, of U.S. Non-Provisional application Ser. No. 11/453,808 filed on Jun. 16, 2006 now U.S. Pat. No. 7,430,902 and entitled METHOD OF MONITORING DEPOSITION OF A NOBLE METAL IN A NUCLEAR REACTOR AND DEPOSITION MONITOR THEREFOR.

BACKGROUND OF THE INVENTION

1. Field of the Invention

Example embodiment(s) of the present invention are related in general to a method for monitoring deposition of a noble metal in an intergranular stress corrosion crack (IGSCC) in a metal reactor shroud wall of a nuclear reactor, and to a surface crevice deposition monitor for the reactor.

2. Description of the Related Art

Typically, interior surfaces of a metal reactor shroud wall of a nuclear reactor may be susceptible to the formation and/or propagation of one or more IGSCCs that form during operation of the nuclear reactor.

BRIEF DESCRIPTION OF THE INVENTION

An example embodiment of the present invention is directed to a method of monitoring deposition of a noble metal in an intergranular stress corrosion crack (IGSCC) in a metal reactor shroud wall of a nuclear reactor. In the method, a metal sample may be placed at a location within near an inner surface of the metal reactor shroud wall. The sample may be submerged below a water line in the reactor and includes at least one thermal fatigue crack. The sample is maintained at the location for a given duration, and a given amount of the noble metal is added into the reactor water while the sample is maintained at the location. The sample is then removed.

Another example embodiment of the present invention is directed to a surface crevice deposition monitor for a reactor. The monitor includes a flow conditioner arranged between a securing mechanism and an anchor, and at least one sample holder connected between the securing mechanism and flow conditioner.

BRIEF DESCRIPTION OF THE DRAWINGS

Example embodiments of the present invention will be more clearly understood from the detailed description taken in conjunction with the accompanying drawings/figures. The drawings/figures provided herein are for illustrative purposes only. They illustrate various non-limiting aspects of various embodiment(s) of the invention. Other variations may be possible. Also, as the figures/drawings are provided for illustrative purposes, they may not be drawn to scale. Further, various drawings/figures may show optional equipment which is by definition not required for practicing the present invention.

FIG. 5b shows a sub-holder portion of the sample holder in FIG. 5a.

DETAILED DESCRIPTION OF EXAMPLE EMBODIMENTS OF THE INVENTION

The following description of the invention is provided with respect to various non-limiting example embodiment(s) thereof. The following description is not meant to unduly limit or restrict the present invention. Variations of the example embodiment(s) described herein are within the scope of the present invention.

In view of the foregoing, there is to be described in more detail hereafter a method of monitoring the extent to which an IGSCC is formed and/or propagated within the metal reactor shroud wall for safety concerns (e.g., if the cracks get too deep, the structural integrity of the metal reactor shroud may be decreased below a functional or safety limit). Also, there is to be described a method of slowing down, stopping and/or partially or substantially repairing the IGSCC or its formation and/or propagation within the metal reactor shroud wall.

In one example embodiment of the invention, a sample (e.g., a metallic sample or a sample made of other suitable material) is submerged beneath a surface level of the reactor coolant (e.g., water) contained within the metal reactor shroud. The sample is designed to include at least one IGSCC. Such an IGSCC (in the sample) is referred to herein as a thermal fatigue crack (TFC) because the TFC is created so as to mimic an IGSCC that may be formed and/or propagated within the metal reactor shroud wall. Thus, the TFC has been purposefully formed in the sample, according to one example embodiment of the invention.

The formed sample is then placed at a distance, for example, at about 6" or less from the interior surface of the metal reactor shroud wall. The sample may be placed at other suitable distances (e.g., more than 6" away from the interior surface of the metal reactor shroud wall). In one example, a sample holder holding the sample may be positioned adjacent an inner surface of the shroud wall within about 4" of the nearest fuel bundle (and/or within a range of about 4-10 inches from any fuel bundle) to hold the sample. In another example, the sample holder may be used to hold probes and/or other indicators or sampling devices, for example.

Over time, it is expected that the sample (e.g., a metal such as carbon steel, stainless steel, low carbon stainless steel such as 304L stainless steel, etc.) should substantially mimic the behavior/performance of the interior surface of the metal reactor shroud wall as it relates to the formation and/or propagation of an IGSCC. Thus, for example, it is believed that if the sample shows excessive formation and/or propagation of TFCs, that excess formation or propagation should be a reflection of the extent of IGSCCs formed and/or propagated in the metal reactor shroud wall itself.

In other words, the degree of TFC formation and/or propagation within the sample should to reflect the degree of IGSCC formation and/or propagation within the metal reactor shroud wall. Thus, to monitor the structural integrity of a metal reactor shroud over a period of time, it is possible to do so by closely inspecting the sample which had been placed and maintained in the metal reactor shroud at least partly during the reactor operation. Inspection is easier if performed after the sample is removed from the metal reactor shroud at an appropriate/convenient time interval. The removed sample is inspected and analyzed for formation and/or propagation of TFCs.

According to another example embodiment of the invention, for example, typically when the nuclear reactor is shut down for maintenance purposes (known as an outage), at least one of the samples (if multiple samples are used) may be removed and examined by a variety of methods including, but not limited to, acid stripping analysis or inspection under scanning electron microscopy (SEM) or otherwise. Based upon examination of the sample crack (TFC) for the extent/degree to which a noble metal has deposited therein, the amount of the noble metal that may be injected into the reactor coolant may be adjusted (e.g., increased, decreased or otherwise altered) to counteract the formation and/or propagation of IGSCCs in the metal reactor shroud wall itself. This is possible because the reactor coolant comes in direct contact with the interior surface of the metal reactor shroud.

It is believed that the noble metal diffuses into the cracks not only within the sample TFCs but also within the cracks (IGSCCs) present (formed and/or propagated) within the metal reactor shroud wall itself. The noble metal ultimately may find its way into the IGSCCs and the TFCs and deposits itself therein, respectively. The noble metal may diffuse deeper into the IGSCC, well beyond where dissolved oxygen may penetrate into the IGSCC itself. Thus, it is believed that the noble metal may be able to prevent, mitigate or slow down formation and/or propagation of the IGSCC, which is believed to be accelerated and/or worsened by the presence of dissolved oxygen in the reactor coolant.

Typically, in examination by either acid stripping analysis, SEM inspection or otherwise, the amount of a noble metal that should be deposited into the crack may be determined. Based upon the depth of the crack (TFC), and/or the level of noble metal deposited within the crack (TFC), the level of noble metal that is injected into the reactor coolant may be increased, decreased (or otherwise adjusted) as necessary to mitigate, reduce, eliminate or otherwise reduce the formation and/or propagation of an IGSCC within a metal reactor shroud wall. It is believed that the noble metal may penetrate much deeper into the IGSCC than the dissolved oxygen.

In the figures, numbering is used consistently to refer to the same component(s) or parts thereof. Note that an IGSCC 30 is modeled as to be described in detail below by the thermal fatigue cracks (TFCs) referred to in FIGS. 4, 5a, and 6a to 6c and labeled as cracks 30a and 30b.

Figure 1:
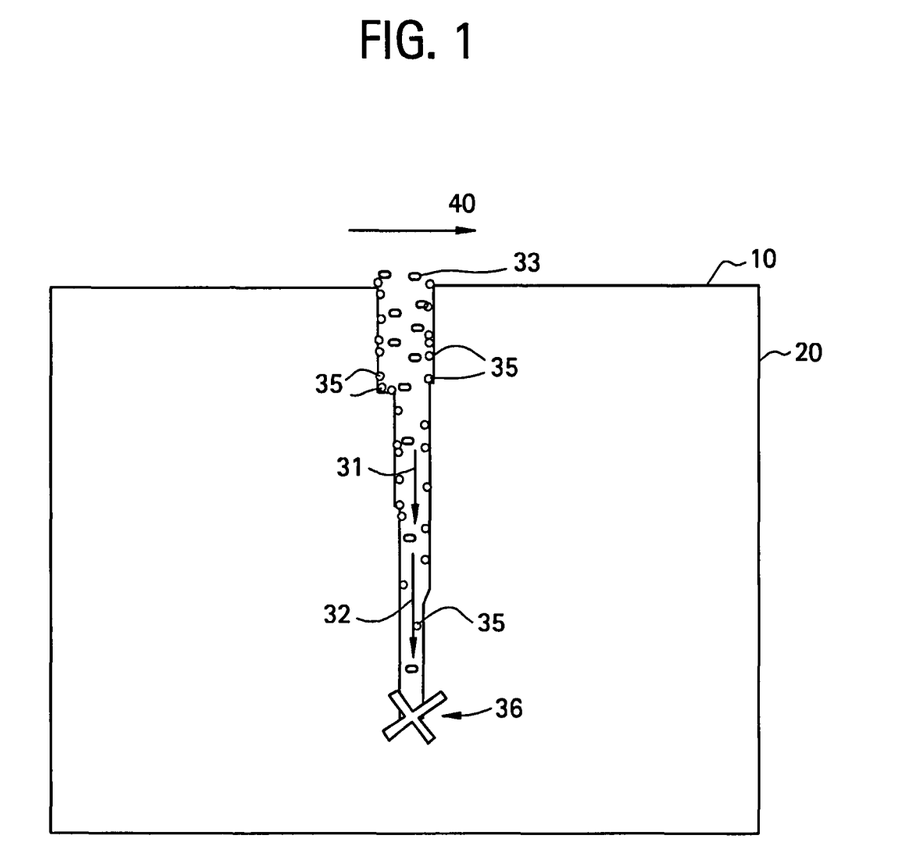
FIG. 1 is a cross-sectional view of an interior wall/surface of a metal reactor shroud in a reactor, illustrating a sample where molecules mimicking dissolved oxygen molecules and a noble metal penetrate into the IGSCC of the metal reactor shroud, with the sample having at least one or more TFCs formed therein.

FIG. 1 is a cross-sectional view of an interior wall/surface of a metal reactor shroud in a reactor, illustrating a sample where molecules mimicking dissolved oxygen molecules and a noble metal penetrate into the IGSCC of the metal reactor shroud, with the sample having at least one or more TFCs formed therein.

Referring to FIG. 1, an internal surface 10 of a portion of a metal reactor shroud 20 is depicted with an illustration of an IGSCC 30. FIG. 1 is a cross-sectional view of an interior wall of the metal reactor shroud showing flow direction 40 of reactor coolant (e.g., water) flowing past the IGSCC 30 within the thickness of the metal reactor shroud 20 wall. The flow direction of the coolant, while shown flowing from left to right, may be in an opposite (or other) direction as well.

The reactor coolant flowing within metal reactor shroud 20 contains dissolved oxygen molecules 33. These dissolved oxygen molecules 33 typically could cause the IGSCC 30 to form and/or propagate deeper into the cross-section of the metal reactor shroud wall. Arrows 31 and 32 may illustrate movement of oxygen into the IGSCC 30. Over time, the crack 30 typically continues to penetrate deeper into the metal reactor shroud 20, for example, in the general direction of arrows 31 and 32. The IGSCC 30 typically could also spread from the surfaces into the metal reactor shroud wall (not shown).

FIG. 1 also shows oxygen and a noble metal penetrating into the IGSCC 30. The metal reactor shroud 20 has an inner surface 10 with reactor coolant flowing in direction 40 (shown left to right only as an example flow), together with both dissolved oxygen molecules 33 and noble metal molecules 35. The oxygen molecules 33 and noble metal molecules 35 are depicted as penetrating into the IGSCC 30. It is believed that the noble metal molecule(s) 35 penetrate deeper into the IGSCC than do the dissolved oxygen molecule(s) 33. By doing so, it is believed that noble metal molecule(s) (and/or particles thereof) prevent and/or otherwise mitigate the effects of the dissolved oxygen molecules 33 such as potentially causing IGSCC 30 to form and/or propagate deeper or further into the interior of the metal reactor shroud 20. The so described effect of the noble metal may be depicted by the "X" at 36 in FIG. 1

Figure 2:
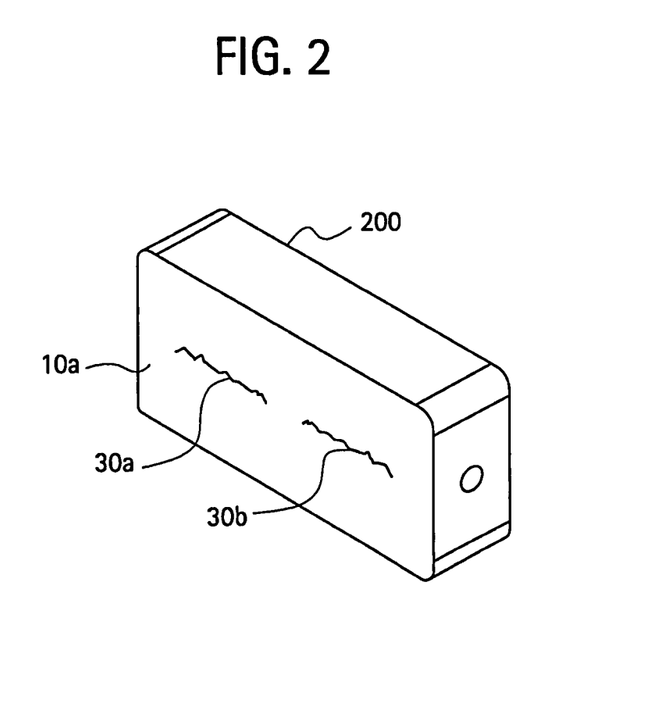
FIG. 2 is an example sample holder assembly containing three samples, in accordance with the example embodiments of the present invention.

FIG. 2 is an example sample holder assembly containing three samples, in accordance with the example embodiments of the present invention. In FIG. 2, a sample 200, which may be made of a metal or other suitable material, is shown. The sample 200 may be made of the same material used to form the metal reactor shroud 20. The sample 200 shown in FIG. 2 contains at least one formed IGSCC referred to herein as a thermal fatigue crack (TFC).

The TFC within the sample is intended to mimic an IGSCC within a metal reactor shroud. The sample 200 is intended to be placed in the metal reactor shroud 20 as described herein. In another example, the sample may be placed at a distance of about 6" or less from the interior surface of the metal reactor shroud wall, typically below the surface of the reactor coolant flowing in the metal reactor shroud 20 (e.g., at some depth which may be variable so long as it is below the surface of the waterline within the shroud.

The sample 200 of FIG. 2 contains two TFCs 30a and 30b. However, 1, 2, 3 or another multiple of TFCs may be provided in sample 200. Also, while sample 200 is depicted as having a rectangular shape, the surface 10a of sample 200 may be relatively flat and/or may mimic the curvature of the inner surface 10 of the metal reactor shroud 20. The sample 200 could be of any shape, whether it is rectangular, or otherwise, so long as the shape permits the sample 200 to mimic the formation and/or propagation characteristics of an IGSCC within a metal reactor shroud wall. Thus, any shape or configuration permitting the same may be used.

According to an example embodiment of the present invention, the sample 200 may be made of a metal, for example, of carbon steel or stainless steel, some other steel-based alloy or some combination thereof. Furthermore, the metal of the sample 200 may be the same as the metal used to form the metal reactor shroud wall itself. It is possible that the metal reactor shroud wall is made of carbon steel and the metal sample 200 be made of stainless steel (e.g., 304L stainless steel or a low carbon steel) or vice versa.

In another example, the metal of the sample 200 may contain one or more TFCs 30a, 30b having a variety of dimensions in length, width and depth. For example, a thermal fatigue crack may have a length of at least about 0.5 inches, a width of at least about 0.5 mils (0.0005") and a depth of at least about 100 mils (0.1"). In one example, other dimensions for the TFC 30a, 30b include a length of at least about 0.75 inches, a width of at least about 0.001 inches and depth of at least about 0.5 inches. Another dimension for the TFC 30a, 30b may be a length of least about 1", a width of at least about 0.0015", and a depth of at least about 0.75". Examples of TFC dimensions provided as L×W×D are ½"×0.005"×0.1"; ¾"×0.001"×0.5"; 1"×0.0015"×0.75"; ½"×W×0.1"; ¾"×W×0.5"; 1"×W×0.75" where W=0.002"; 0.0025"; 0.003"; 0.0035"; 0.004"; 0.0045"; or 0.005". Other dimensions for the TFC within a sample may be used.

According to another example embodiment of the present invention, the sample 200 may be provided in a holder configured to hold one or more samples therein. For example, the sample holder may be configured to hold 1, 2, 3, 4, 5 or more samples within. In an alternative, the sample holder may be used to hold probes and/or other indicators or sampling devices, for example.

According to another example embodiment of the invention, the metal sample 200 containing at least one TFC 30a, 30b may be placed in the sample holder which itself is then placed adjacent to an inner surface of the metal reactor shroud 20 at a place so that the metal sample 200 itself is held below the surface of the reactor coolant. The reactor coolant surrounds various fuel bundles within the nuclear reactor and contacts the inner surface 10 of the metal reactor shroud 20 and surface 10a of the sample 200.

In nuclear reactors, such as boiling water reactors, at least five standard depth levels are recognized as depth levels H1, H2, H3, H4, or H5. Each of these levels represents a depth below the surface or waterline of the reactor coolant, and spans beneath the waterline, anywhere between the core plate (bottom of fuel) and the bottom of the reactor core. The H1-H5 levels may represent successively deeper depth bands or regions below the reactor coolant waterline within the metal reactor In one example, the H1 level may be a banded region anywhere from about 0 to about 9 inches from the surface of the reactor coolant contained within the metal reactor shroud. The H2 level may be anywhere from about 9 inches to about 40 inches from the surface (e.g., >9-40"). The H3 level may be anywhere from about 40 inches to about 54 inches from the surface (e.g., >40-54"), the H4 level may be anywhere from about 54 inches to about 105 inches from the surface (e.g., >54-105"), and the H5 level may be anywhere from about 105 inches to 194 inches from the surface (e.g., >105-194"). The use of the sample holder is optional, so long as the sample 200 is otherwise maintained at a desired depth below the reactor coolant waterline within the metal reactor shroud 20.

According to one example, the sample 200 is submerged within the reactor coolant and maintained therein for at least 2 weeks or more. Furthermore, one or more samples 200 (e.g., 2, 3, 4, 5, or more) having one or more TFCs 30a, 30b (e.g., 2, 3, 4, 5, or more) may be placed in the metal reactor shroud 20 as described above. If multiple samples 20 are used, each may be removed at different time intervals to obtain a staggered temporal picture of the formation and/or propagation of IGSCCs 30 in the metal reactor shroud 20 wall, as reflected by inspection of the one or more TFCs 30a, 30b in the one or more samples 200.

A purpose of maintaining the sample 200 in the metal reactor shroud 20 within the reactor coolant for at least 2 is to expose the sample 200 to the same conditions that are present within the metal reactor shroud itself. Therefore, as a sample 200 is removed from the metal reactor shroud 20 for examination, the sample 200 may provide a snapshot of the condition of the metal reactor shroud 20 wall as it existed at the time the sample 200 was removed for inspection.

A noble metal may be injected into the reactor coolant for a number or reasons, such as to stop formation and/or prevent or slow down the propagation of an IGSCC within a metal reactor shroud 20 wall. A variety of noble metals may be used for this purpose. For example, one example noble metal for use in conjunction with various example embodiments of the present invention include, but are not limited to, Pt, Rh, Pd, Ag, Au, Ir or a combination or combinations thereof. In one specific example, Pt, Rh or combinations thereof may be used. In another example, a Pt/Rh mix may be used, which may vary in ratio from plant to plant, such as a 2:1 Pt to Rh ratio. In some plants, only Pt may be used as the noble metal additive.

As previously described herein with regard to various example embodiment(s) of the present invention, it is believed that the noble metal injected into the reactor coolant is carried by the reactor coolant into an IGSCC 30 within the metal reactor shroud 20 wall and into TFC 30a, 30b within the sample 200 that is held submerged within the reactor coolant. It is believed that the noble metal penetrates into the IGSCC 30 and/or the TFC 30a, 30b to stop formation and/or reduce, minimize or slow down propagation of the IGSCC 30 and of the TFC 30a, 30b within the metal reactor shroud 20 wall and the sample 200, respectively.

According to an example embodiment of the present invention, a noble metal is introduced into the reactor fluid while the reactor is in operation (e.g., generating power). The noble metal(s) may be injected at a rate sufficient to maintain a level of at least about 100 parts per trillion (ppt) in the reactor fluid (e.g., water) for a duration of about 2 weeks. Typically, this requires, for example, a noble metal injection rate into the reactor fluid (e.g., feedwater) of about 0.3 grams per hour. Other suitable injection rates, noble metal levels and methods for introducing a noble metal into the reactor fluid may be used. Injecting of a noble metal may be carried out according to the details provided in commonly-assigned U.S. Pat. Nos. 5,600,961; 5,608,766; 5,602,888; 5,818,893; 5,805,653; 5,130,080; 5,130,081; 5,135,709 and 5,164,152, for example.

As shown in FIG. 1, the noble metal may counteract the deleterious IGSCC 30 formation and/or propagation that are believed to occur due to dissolved oxygen within the reactor coolant. This is shown by the "X" corresponding to element 36, for example.

According to another example embodiment of the present invention, the sample 200 submerged within the reactor coolant is removed at a given time interval. The sample may then be analyzed for evaluating the status of IGSCCs 30 formed in the metal reactor shroud 20. This may be accomplished by examining the TFCs 30a, 30b within the sample 200.

Figure 3:
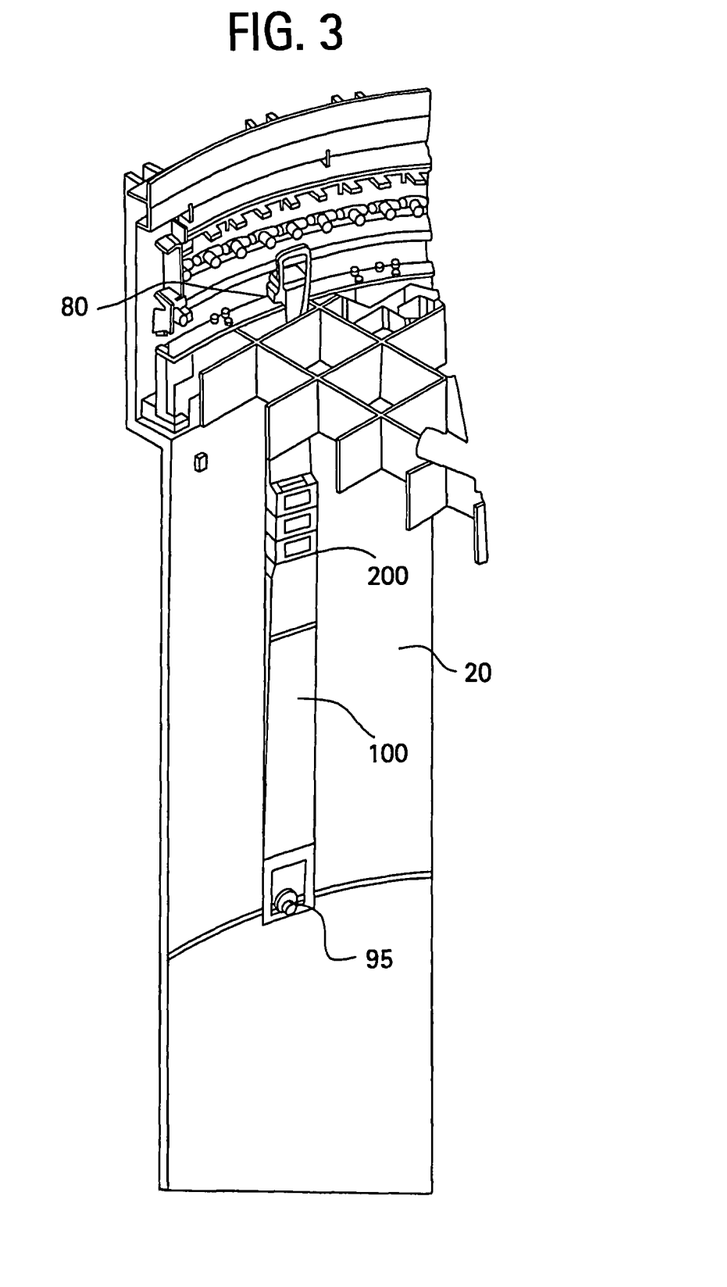
FIG. 3 is a cut-out view of a portion of a metal reactor shroud including a sample holder.
Figure 4:
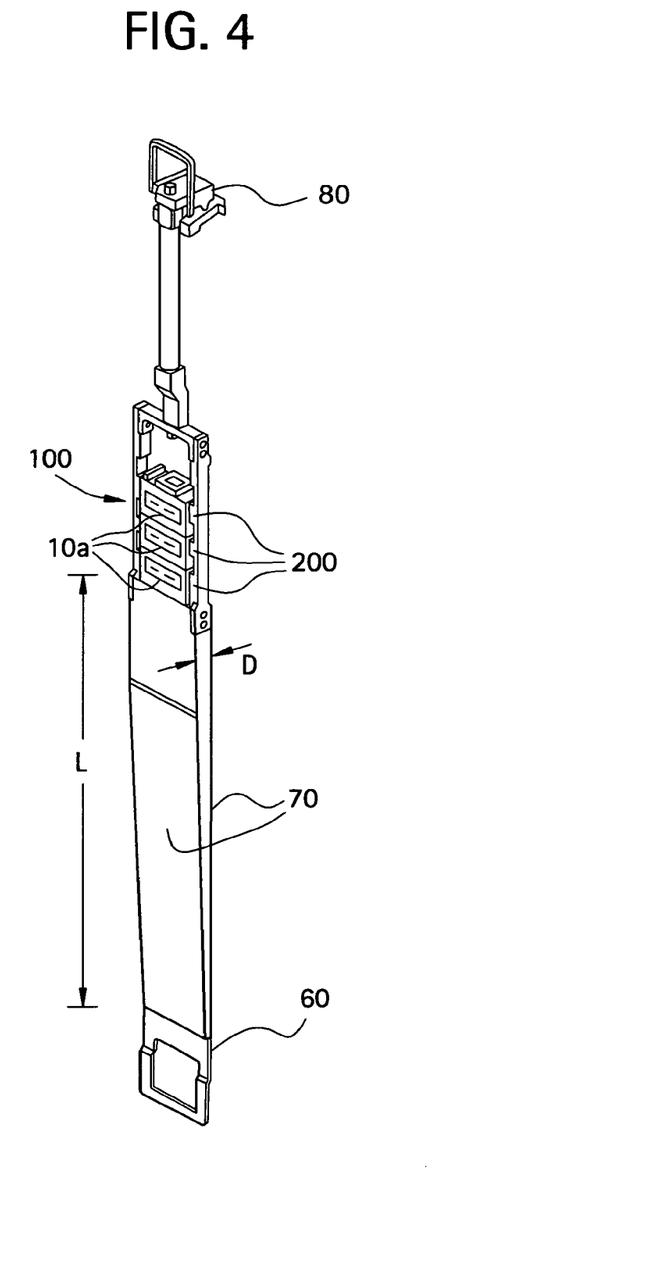
FIG. 4 is a cut-away view showing only the sample holder without shroud.

FIG. 3 is a cut-out view of a portion of a metal reactor shroud including a sample holder; and FIG. 4 is a cut-away view showing only the sample holder without shroud. Referring to FIGS. 3 and 4, there is shown a holder 100 for holding one or more sample(s) 200. The holder 100 may include a securing mechanism 80, an anchor 60, a mechanism for holding sample(s) 200 within the holder 100, and a flow conditioner 70 arranged below a location where sample(s) 200 may be held within the sample holder 100.

The flow conditioner 70 may have a length L and a depth D. The dimension D may taper down to smaller values in the direction from securing mechanism 80 to anchor 60, as shown in FIG. 4, for example. The dimensions of the flow conditioner 70 in terms of a ratio of L/D may provide for a smoother flow (as depicted by arrows 40) of the reactor coolant across the surface 10a of the sample 200. While the particular sample holder 100 of FIGS. 3 and 4 is depicted, any other equivalent sample holder may be used. A sample holder, however, is optional if the sample 200 can be held in place where necessary or desired to adequately perform the requisite monitoring function.

Referring to the flow conditioner 70 in FIG. 4, the dimensions L and D thereof may be adjusted so as to permit flow of reactor coolant past the surface(s) 10a of sample(s) 200 in relatively smooth, uninterrupted and/or undisturbed fashion. The flow conditioner 70 may provide a desired flow (e.g., in relatively uninterrupted, undisturbed and/or smooth fashion) due to its wedge-shape, in which the depth D at the top of the flow conditioner 70 (closer to the securing mechanism 80) approaches zero (or is smaller) than at its bottom end (closer to the anchor 60). In one example, the ratio of L/D may vary from about 1:1 to about 20:1. Also, other intervening L/D values may be used with flow conditioners 70 in conjunction with embodiments of the present invention. Thus, for example, other L/D ratios for the flow conditioner 70 suitable for use in conjunction with example embodiments of the present invention may include a range of about 5:1 to 15:1, and a specific ratio of about 12:1 for example.

Referring to FIG. 3, the sample 200 may be located adjacent to an inner surface 10 of the shroud wall 20, or at a distance of about 2-3" or less from the inner surface 10 of the metal reactor shroud 20 wall. In an example, the distance between surface 10 and surface 10a may be 6" or less. In another example, the sample holder 100 may be positioned adjacent the inner surface 10 of the metal reactor shroud 20 wall co as to be within about 4" of the nearest fuel bundle thereto (and/or within a range of about 4-10 inches from any fuel bundle) to hold the sample. A securing mechanism 80 may be provided for securing the sample holder 100 with its sample(s) 200 in place, and a plug 95 may be provided for securing the anchor 60 to the metal reactor shroud 20.

Figure 5A:
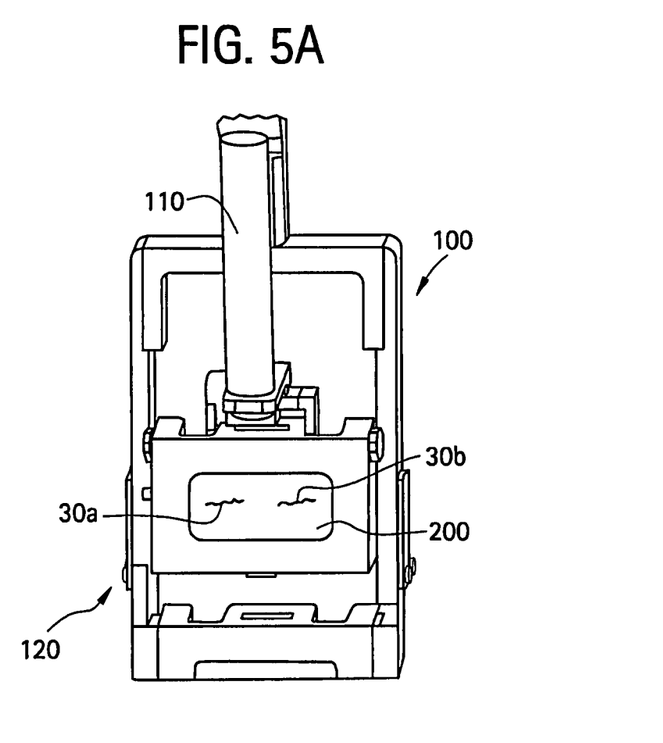
FIG. 5a is an enlarged view of a portion of the sample holder showing how a sample may be held within a cavity of the sample holder.
Figure 5B:
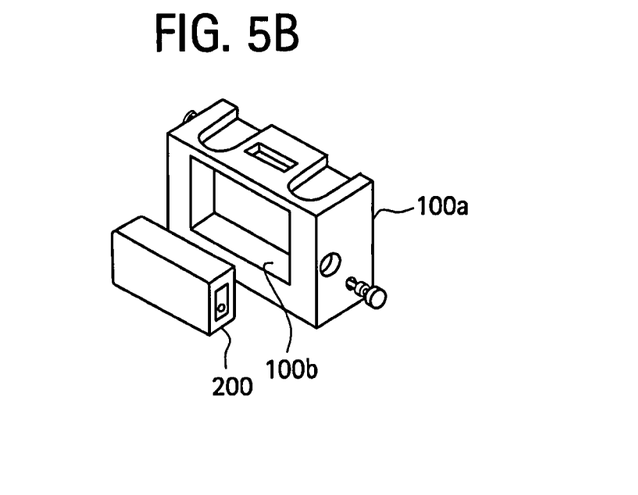

FIG. 5a is an enlarged view of a portion of the sample holder showing how a sample may be held within a cavity of the sample holder; and FIG. 5b shows a sub-holder portion of the sample holder in FIG. 5a. FIG. 5a is a close-up view of a portion of the sample holder 100 with sample 200 held in place, where the sample contains two TFCs 30a, 30b as shown. The sample holder 100 may include a rod 110 and a securing mechanism 120 to secure and maintain sample 200 in place. Other securing mechanisms may be used.

FIG. 5b shows how sample 200 may fit into a cavity 100b using sub-holder 100a. In FIG. 5b, the cavity 100b receives sample 200. Sample 200 is secured therein by searing mechanism 120, which is received through a base (not shown) on either side of the sub-holder 100a.

Figure 6A:
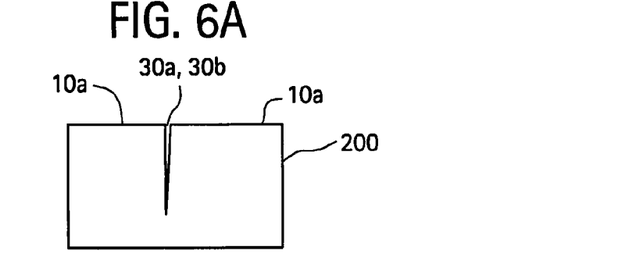
FIGS. 6a-6c illustrates the sample removed from the metal reactor shroud, where one or more cracks are split open so that the sample breaks into two portions exposing an interior surface thereof.
Figures 6B, 6C:
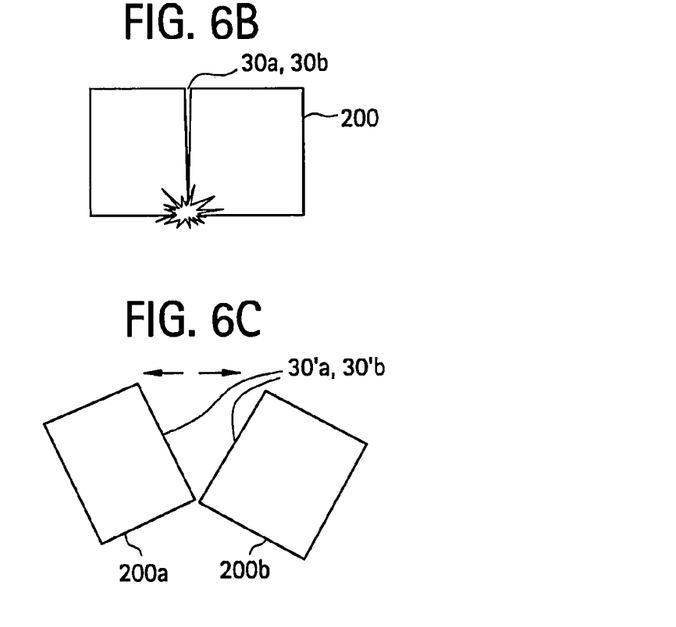

FIGS. 6a-6c illustrates the sample removed from the metal reactor shroud, where one or more cracks are split open so that the sample breaks into two portions exposing an interior surfaces thereof. Referring to FIGS. 6a-6c, after having been exposed to the conditions within the metal reactor shroud 20 for a period of time during operation of a nuclear reactor, the sample 200 is removed and then the crack (30a or 30b) within the sample 200 is separated to split the sample into parts 200a and 200b exposing interior crack surfaces (30'a and 30'b).

Figure 7:
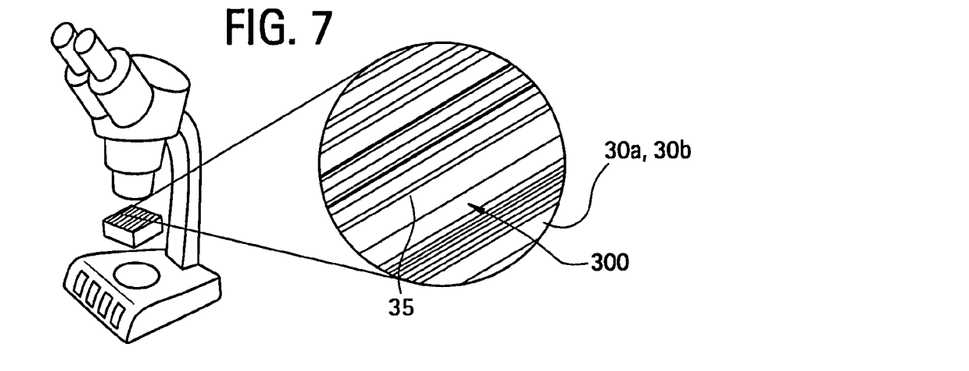
FIG. 7 illustrates an example process of using a scanning electron microscope (SEM) to reveal the deposition of a noble metal on surfaces of the crack.

FIG. 7 illustrates an example process of using a scanning electron microscope (SEM) to reveal the deposition of a noble metal on surfaces of the crack. Thereafter, the interior surfaces (30'a and/or 30'b) of the TFC 30a, 30b (expected to mimic the characteristics of IGSCCs 30 within the metal reactor shroud 20) are analyzed by a variety of methods, one of which may be analysis under a microscope showing a field of view 300 and revealing where noble metal molecules 35 (or particles thereof) may have deposited within the TFC 30a, 30b on surfaces 30'a and/or 30'b. Instead of SEM inspection, stripping analysis may be used.

Acid stripping analysis refers to a dissolution process performed in a chemistry laboratory to remove deposited noble metal from the surface of a sample. For example, a sample loaded with noble metal is placed in a beaker containing a mixture of hydrochloric acid (HCl—e.g., at least about 15-25% by weight in water, such as 22%) and nitric acid ($HNO_3$—e.g., at least about 15-25% by weight in water, such as 20%) and brought to a boil for a period of about 2 minutes. According to one embodiment, the acid mixture used, for example, may be prepared by mixing a stock solution of HCl (e.g., 35-40% HCl by weight) with a stock solution of $HNO_3$ (e.g., 80% $HNO_3$ by weight) wherein the mixture is a 3:1 by volume mixture of HCl:$HNO_3$. Other suitable acid mixtures may be used.

The acid mixture dissolves the noble metal from the sample surface. The acid beaker containing the sample may be then optionally placed in an ultrasonic bath to further facilitate removal of the noble metal from the surface. The sample is then removed from the beaker and the acid solution is diluted to, for example, 50 mL. That solution is then analyzed with inductively coupled plasma mass spectrometry (ICPMS) or other mass spectrometry with suitable resolution to determine the amount of the noble metal deposited in and/or around the TFC 30a, 30b. Other methods suitable for determining or measuring the amount of noble metal deposited in or around the TFC 30a, 30b may be used.

For example, SEM inspection may be conducted. SEM inspection refers to inspecting surfaces such as 30'a and/or 30'b under a scanning electron microscope at a suitable magnification and/or suitable wavelength to provide or elucidate sufficient detail at surfaces 30'a and/or 30'b regarding the extent to which noble metal(s) may have deposited on such surfaces. If an insufficient amount of a noble metal is deposited on surfaces such as 30'a and/or 30'b, the amount of the noble metal(s) that may be introduced or injected into the reactor fluid may be increased, decreased, or otherwise adjusted to achieve the desired level of noble metal(s) to be deposited on surfaces 30'a and/or 30'b. By so adjusting the amount of noble metal injected into the reactor fluid, the deposition of noble metal into TFCs 30a, 30b and IGSCCs 30 is expected to be improved.

According to an embodiment, noble metal is injected into the reactor fluid when it is believed that the amount of noble metal being deposited within an IGSCC is expected to be less than or equal to about 0.1 μg/cm2. Typically, the maximum amount of noble metal that may be introduced and/or injected into the reactor fluid should be no more than about 30 gm/year, which is the equivalent of no more than about 30 μg/cm2 of noble metal depositing on the fuel rod cladding within the nuclear reactor.

The noble metal may also be introduced/injected into the reactor fluid when it is believed that the electrochemical corrosion potential (ECP) at the standard hydrogen electrode (SHE) is expected to be below about −230 mV. So, for example, if the ECP at the SHE is expected to be about −250 mV, then noble metal should be introduced or injected into the reactor fluid.

Pursuant to an embodiment, the noble metal may be injected at a rate of about 0.1 gm/hr, about 0.2 gm/hr, about 0.3 gm/hr, 0.4 gm/hr, and 0.5 gm/hr or more as appropriate. If the set maximum (according to one embodiment) of 30 gm/year is already met, then H2 may be added to the reactor fluid to adjust the ECP at the SHE to be above about −230 mV.

Figure 8:
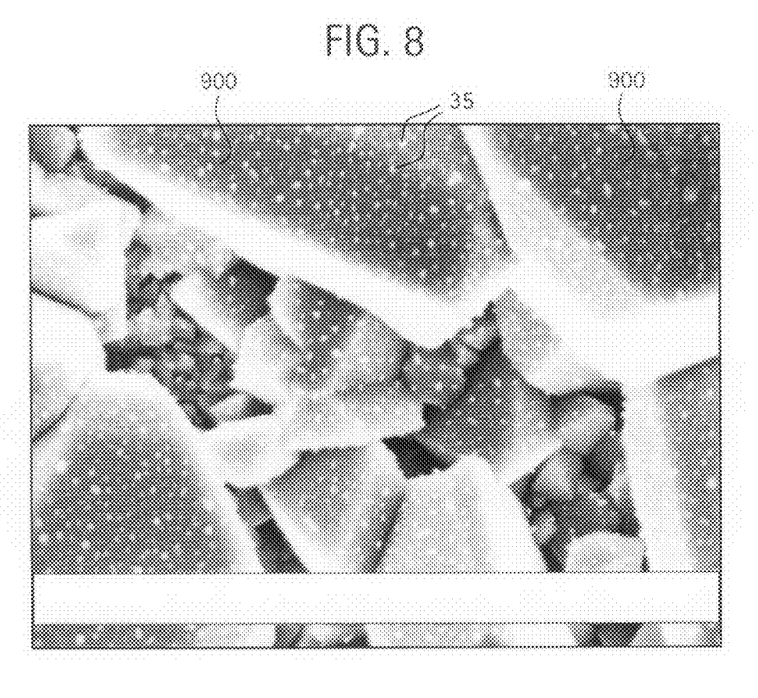
FIG. 8 is an SEM photograph (at 100,000×) of a test stainless steel sample.

FIG. 8 illustrates a test stainless steel sample at an interior surface of an artificially created crack/crevice (formed using a stainless steel washer as a shim) when the crack/crevice was exposed to water containing 39 parts per billion (ppb) Pt. The boulder-like structures 900 represent an oxide (e.g., iron oxide) formed on the interior surface of the crack/crevice. The grainy particles 35 are deposited Pt particles Having described various embodiments of the present invention, the following examples are provided to illustrate various non-limiting aspects of the invention.

EXAMPLE 1

A TFC may be formed in a stainless steel (or other metal) sample by the following procedure:
(1) Hold metal sample and pull two ends of sample with a load sufficient to apply a tensile stress to the sample;
(2) Apply hot and cold material to sample under tensile stress in alternating (or other suitable) manner sufficient to initiate and/or propagate a TFC in the sample. This application of hot and cold material may include the use of a jet of extremely hot water followed by a jet of extremely cold water.
(3) Repeat step(s) (1) and/or (2) as needed to yield a TFC having the desired dimensions in terms of length, width and depth thereof.

Having described various embodiments, the following claims are appended below. The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A surface crevice deposition monitor for a nuclear reactor, comprising:
a flow conditioner arranged between a securing mechanism and an anchor, the flow conditioner in the shape of a wedge having two surfaces that define planes which intersect at an acute angle, and
at least one sample holder connected between the securing mechanism and flow conditioner.

2. The monitor of claim 1, wherein the flow conditioner has a length to depth (L/D) ratio of about 20:1 or less.

3. The monitor of claim 2, wherein said L/D ratio is in a range of about 5:1 to about 15:1.

4. The monitor of claim 3, wherein said L/D ratio is 12:1.

5. The monitor of claim 1, wherein the monitor is placed against a metal shroud of the reactor, and the shroud is composed of carbon steel or stainless steel.

6. The monitor of claim 5, wherein a given sample held by the sample holder is composed of carbon steel or stainless steel.

7. The monitor of claim 6, wherein the first and second metals are the same.

8. The monitor of claim 1, wherein the sample holder is adapted to hold any of one or more probes, indicators, metal samples or other sampling devices.

\* \* \* \* \*